Dec. 5, 1933.     J. E. ESHBAUGH     1,937,879
GEARLESS TYPE PRESSURE GAUGE
Filed Aug. 22, 1928
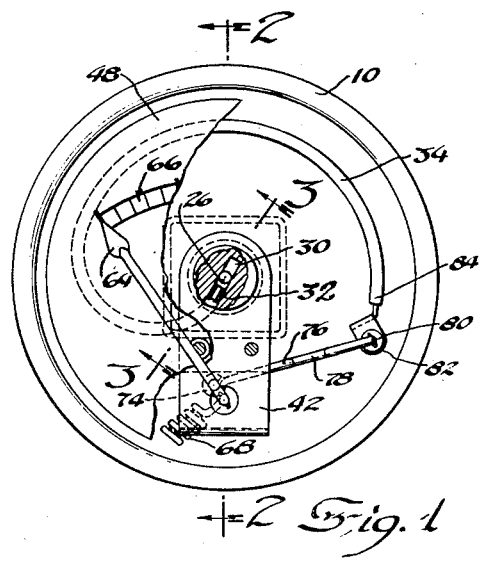
Fig. 1
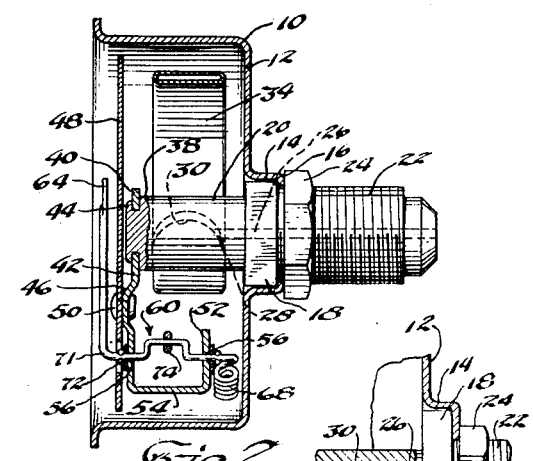
Fig. 2
Fig. 3
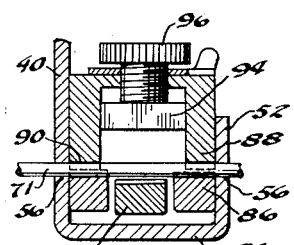
Fig. 4
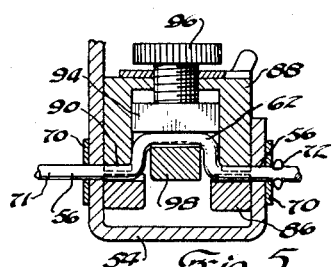
Fig. 5
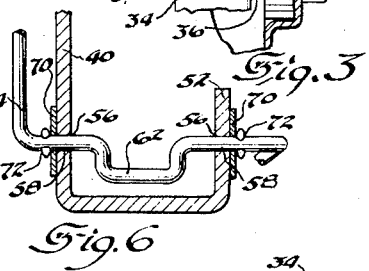
Fig. 6
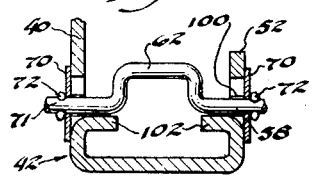
Fig. 8
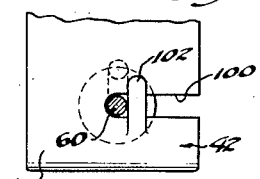
Fig. 9
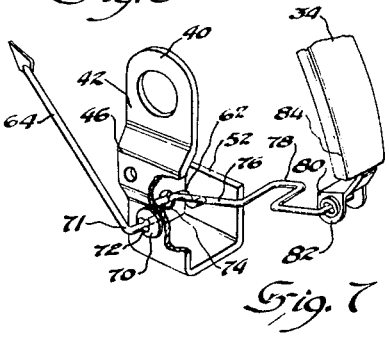
Fig. 7
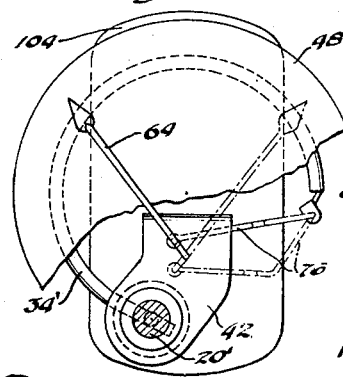
Fig. 10
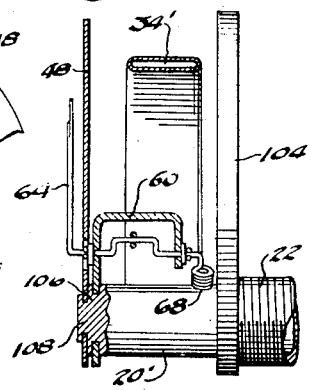
Fig. 11
Inventor
Jesse E. Eshbaugh
by Blackmore, Spencer & Flint
Attorneys Patented Dec. 5, 1933

1,937,879

UNITED STATES PATENT OFFICE 1,937,879

GEARLESS TYPE PRESSURE GAUGE

Jesse E. Eshbaugh, Flint, Mich., assignor to A C Spark Plug Company, Flint, Mich., a company of Michigan Application August 22, 1928. Serial No. 301,235

13 Claims. (Cl. 73—109)

This invention relates to improvements in gauges of the Bourdon tube type.

Prior gauges of the Bourdon tube type have positioned the stud or socket for receiving the tube end at one side or near the periphery of the casing. This construction was thought necessary due to the fact that the Bourdon tube was curved on substantially the arc of a circle. In the present invention I mount the socket centrally in the back wall of the casing and secure the end of the Bourdon tube in an arcuate milled slot formed in the socket and within the casing and make use of a spiral Bourdon tube.

Prior constructions have also used a mounting plate and a plurality of posts on which the gauge mechanism is mounted. The present invention eliminates both mounting plate and pillars or posts.

To the end of the socket there is attached one arm of an L-shaped frame, the second arm of which is bent into parallelism with the first and between the arms of the L the pointer swinging mechanism is mounted. The frame is rigidly held on the socket end by riveting over the socket edge.

The pointer swinging mechanism and the pointer of the present invention are formed of an integral piece. The whole is constructed of a wire which is formed between the arms of the L into crank shape and to this crank there is attached a link, the opposite end of which is connected to the free end of the Bourdon tube. By suitably shaping the crank the pointer or index may be made to swing either clockwise or counter-clockwise.

The outer free end of the pointer swinging mechanism is formed into an index or a pointer which travels over a scale on a suitable dial which is secured to a raised portion of the frame. The opposite end of the pointer swinging mechanism is formed into coil shape and acts as a weight to return the pointer to its zero position.

Suitable washers are positioned over the wire at the opposite sides of the arms of the L-shaped frame and the wire is then suitably pinched adjacent the washers to form protuberances which hold the washers and the mechanism in fixed position.

As a modification of the invention the socket is positioned in a frame at the side of the casing and the frame and dial both mounted on the socket end by suitably riveting over the socket edge.

As a modification of the support for the pointer swinging mechanism, slots are provided in the arms of the L-shaped member and after the crank portion of the pointer swinging mechanism has been inserted in the slots, suitable ears are bent over to hold the crank portion in position.

In the drawing:

Fig. 1 shows a front view of the gauge with parts broken away for purposes of clearer illustration.

Fig. 2 is a section through the gauge substantially on the line 2—2 of Fig. 1;

Fig. 3 is an enlarged detailed view of the connection of the Bourdon tube with the socket and the mounting of the casing on the socket.

Figs. 4 and 5 are detailed views of the machine or tool for forming the crank in the pointer on the frame.

Fig. 6 is an enlarged sectional view through the crank showing the manner of securing the crank in the L-shaped frame.

Fig. 7 is a perspective view of the pointer swinging mechanism and its inter-connected parts.

Figs. 8 and 9 are detailed views of a modification of the structure of Fig. 6.

Figs. 10 and 11 are views corresponding to Figs. 1 and 2 of a modification.

Referring to the drawing, the numeral 10 indicates the case of the gauge. The back portion 12 of the case is provided with an out-turned preferably squared portion 14 having an inturned flange 16. Within the out-turned part 14 there is received the square nut portion 18 of a socket 20 extending within the casing as shown in Fig. 2. The outer extremity 22 of the socket 20 is screw-threaded for the reception of a nut 24 which is screwed tightly against the flange 16 and rigidly holds the case 10 to the socket 20. The exposed portion of the threaded end 22 may be used to secure the case to a suitable mounting.

The socket 20 is provided with a bore 26 which extends from the end of the threaded portion 22 to the point 28 where it joins on to a milled arcuate slot 30 formed in the socket 20. Within the milled slot 30 there is received the end 32 of a Bourdon tube 34. The end 32 is rigidly secured in the slot 30 by means of solder as shown at 36.

Secured to the end 38 of the socket 20 within the casing 10, is the longer leg 40 of an L-shaped frame 42. The frame is secured to the socket by riveting over the edge 44 of the end 38.

The longer leg 40 is provided with a projecting portion 46 intermediate its length and to this projection there is secured the dial 48 by means of the rivets 50.

The shorter leg 52 of the frame 42 is bent into parallelism with the leg 40 and both legs are joined by the base portion 54. Both legs 40 and 52 are provided with suitable openings 56, the purpose of which will now be described.

Within the opening 56 there is received the journal portions 58 of the pointer swinging mechanism indicated as a whole at 60. The pointer swinging mechanism comprises the journal portions 58 and the crank arm 62.

Integral with the pointer swinging mechanism 60 is the index 64 which swings over a suitable scale 66 provided on the dial 48.

Integral with the opposite end of the pointer swinging mechanism 60 is a coil 68 which acts as a weight to return the pointer to the zero position shown in Fig. 1.

At each leg of the frame 42 over the journal portions 58, suitable washers 70 are placed and immediately adjacent the washers 70 the wire 71 is pinched as shown at 72 to hold the washers against the arms of the frame and to prevent movement of the pointer swinging mechanism in a direction longitudinally of its axis.

To the crank 62 there is secured the eye 74 of a link 76 having the hook or U-portion 78 and connected at its opposite end 80 to a U-shaped bracket 82 secured to the free end 84 of the Bourdon tube 34.

Referring to the structure of Figs. 4 and 5, it will be seen that the crank 62 of the pointer swinging mechanism is formed after the wire 71 has been inserted through the openings 56 in the legs 40 and 52 of the L-shaped frame 42. The wire after being inserted is rigidly held at its right hand side by means of the lower clamp 86 and the upper clamp 88 of a suitable tool, while the opposite side is free to move inwardly or longitudinally as shown by the opening 90 which is larger than the wire 71. The upper clamp 88 is U-shaped and has the adjusting or calibrating member 94 which may be turned in either direction by means of the screw 96. The crank forming tool has the adjustable crank forming lever 98, which, when the parts are in the position shown in Fig. 4, is moved upwardly as shown in Fig. 5, to form the crank 62. The right hand washer 70 is then applied and the wire pinched at 72 to hold this washer in position. The left hand washer 70 is then applied and after the index 64 has been suitably bent, the wire is again pinched as at 72 to hold the second washer 70 in position. The index 64 is bent in one direction or the other depending upon whether the index is desired to swing from right to left or from left to right. In the construction shown in Fig. 1, the index swings to the right, due to the fact that the crank 62 is above the axis of the journalled portions 58. If it is desired to swing the pointer from the right to the left the index 64 will be bent in the opposite direction so as to cause the crank 62 to project below the axis of the journalled portions 58. The link 76 will now pull the crank from below and cause the index 64 to swing from the right to the left.

The end of the pointer swinging mechanism 60 opposite the index 64 is formed into a coil 68, the purpose of which is to return the pointer to its zero position. When the index 64 is bent to swing from right to left the coil 68 will be positioned with reference to the index 64 so as to cause it to swing to its zero position at the right.

In the modification shown in Figs. 8 and 9, the legs 40 and 52 of the frame 42 are suitably slotted as shown at 100 and into these slots the journalled portions 58 of the crank 62 are positioned. Suitable legs or ears 102 are bent from the legs prior to the formation of the slots 100 and after the pointer swinging mechanism 60 has been positioned in the slots 100 the ears 102 are bent backward as shown in Fig. 9 to prevent the pointer swinging mechanism 60 from leaving the slots 100. With this construction it is not necessary to form the crank 62 in the frame 42 as in the species shown in Figs. 4 and 5.

Referring to the species shown in Figs. 10 and 11, it will be seen that the socket 20' is positioned at the side of the casing and has secured thereto the base plate 104 which rests on the bottom of the casing 10.

To the end of the socket 20' there is secured the frame 42 on which the pointer swinging mechanism is mounted and also the dial 48. The frame 42 and dial 48 are rigidly secured by means of riveted over portions 106 and 108 on the end of the socket 20'.

The pointer swinging mechanism 60, the index 64, coil 68 and inter-related parts are the same as shown in Figs. 1 and 2. By suitably bending the index with reference to the pointer swinging mechanism the index may be caused to swing either from left to right or from right to left.

In the species of Figs. 10 and 11, the Bourdon tube 34' is circular instead of the form as shown in Fig. 1. The dotted line position in Fig. 10 shows the zero pointer position for counter-clockwise movement.

I claim:

1. In a gauge, a casing, a bored socket positioned centrally in the back wall of said casing, a lateral slot in said socket within the casing, a Bourdon tube secured within said slot, a pointer swinging mechanism operatively connected with said tube, and a frame secured to the end of said socket and supporting said mechanism.

2. In a gauge, a casing, a bored socket centrally mounted in the back wall of the casing, a lateral recess in said socket, a Bourdon tube secured in said recess, a frame secured to said socket, a pointer swinging mechanism mounted in said frame, an index secured to said mechanism, said mechanism having an integral weight portion for returning the index to zero position, means for holding said mechanism in said frame, and means for connecting said mechanism to the end of the Bourdon tube.

3. In a gauge, a casing, a bored socket positioned centrally in the back wall of said casing, a lateral slot in said socket within the casing, a Bourdon tube secured within said slot, a pointer swinging mechanism operatively connected with said tube, a frame secured to said socket and supporting said mechanism, and a dial secured to said frame.

4. In a gauge, a casing, a bored socket positioned centrally in the back wall of said casing, a lateral slot in said socket within the casing, a Bourdon tube secured within said slot, a pointer swinging mechanism operatively connected with said tube, a frame secured to said socket and supporting said mechanism, and a dial secured to a raised portion of said frame.

5. In a gauge, a supporting frame rigidly mounted therein, a pointer mounted on said frame, said pointer including an indicating portion and a swinging portion, pinched portions on said swinging portion to hold said pointer on said frame, and washers on said swinging portion between said frame and pinched portions.

6. In a gauge, a casing, a socket centrally mounted in the back wall of said casing, a reduced end on said socket, a frame having an opening receiving said reduced end, means for securing said frame on said reduced end, a pointer and a dial mounted on said frame, and means for moving said pointer.

7. In a gauge, a casing, a socket centrally mounted in the back wall of said casing, a frame mounted on said socket and extending to the side of the casing, a U-shaped end portion on said frame, a pointer swingably mounted in said U-shaped portion, and means for moving said pointer.

8. In a gauge, a casing, a socket mounted in said casing, a reduced end on said socket, an L-shaped frame comprising two legs extending substantially at right angles to each other, one of said legs having an opening to receive said reduced end rigidly to mount said frame, a bent end on one of said legs, a pointer swingably mounted in both legs, the mounting in one leg being in the bent end, and means for moving the pointer.

9. In a gauge having a pointer, a casing, a socket mounted in said casing, an L-shaped frame comprising two legs substantially at right angles to each other, said frame mounted on said socket by one of said legs and said pointer swingably mounted adjacent the other leg, means for swingably mounting said pointer in said legs, a crank on the pointer, and means connected to the crank to move the pointer.

10. In a pointer composed of a single piece of metal of substantially uniform cross-section, said pointer having an index end portion and a swinging portion at an angle to each other, said swinging portion having journal portions, and integral projecting portions pinched from the sides of said journal portions to hold the pointer in position.

11. In a gauge, a supporting frame, a pointer mounted on said frame composed of a single piece of metal of substantially uniform cross-section, said pointer including an indicating portion and a swinging portion, and integral projecting portions pinched from the sides of said swinging portion to hold said pointer on said frame.

12. In a pointer, said pointer comprising a single straight piece of metal of substantially uniform cross-section bent to form an index end portion and a swinging portion, a crank on said swinging portion, and an integral coiled weighted end on said swinging portion to counterbalance the pointer.

13. In a gauge, an L-shaped supporting frame having a plurality of openings, a pointer mounted in said frame, said pointer including an indicating portion and a swinging portion, said swinging portion having journal portions passing through the openings in the arms of the L, and integral projecting portions pinched from said journal portions to hold said pointer in said frame.

JESSE E. ESHBAUGH.